US006013893A

United States Patent [19]

Schneider

[11] Patent Number: 6,013,893

[45] Date of Patent: Jan. 11, 2000

[54] PLASMA BURNER WITH A FLUID-COOLED ANODE

[75] Inventor: Gottfried Schneider, Stuttgart, Germany

[73] Assignee: Deutsches Zentrum fuer Luft- und Raumfahrt e.V., Bonn, Germany

[21] Appl. No.: 09/059,969

[22] Filed: Apr. 14, 1998

[30] Foreign Application Priority Data

Apr. 18, 1997 [DE] Germany ........................... 197 16 235

[51] Int. Cl.[7] ..................................................... B23K 10/00

[52] U.S. Cl. ................................ 219/121.49; 219/121.48; 219/75

[58] Field of Search ......................... 219/121.49, 121.52, 219/121.5, 121.36, 121.48, 74, 75; 313/231.31, 231.41; 315/111.21

[56] References Cited

U.S. PATENT DOCUMENTS

| | | | |
|---|---|---|---|
| 3,830,428 | 8/1974 | Dyos | 219/121.59 |
| 3,914,573 | 10/1975 | Muehlberger | 219/76 |
| 4,455,470 | 6/1984 | Klein et al. | 219/121.49 |
| 5,393,952 | 2/1995 | Yamaguchi et al. | 219/121.5 |
| 5,444,209 | 8/1995 | Crawmer et al. | 219/121.49 |
| 5,660,743 | 8/1997 | Nemchinsky | 219/121.49 |

FOREIGN PATENT DOCUMENTS

| | | |
|---|---|---|
| 0 639 041 | 2/1995 | European Pat. Off. . |
| 30 50 798 | 3/1981 | Germany . |
| 36 42 375 | 6/1988 | Germany . |

*Primary Examiner*—Mark Paschall
*Attorney, Agent, or Firm*—Barry R. Lipsitz; Ralph F. Hoppin

[57] ABSTRACT

In order to provide a plasma burner comprising a fluid-cooled anode and a cathode, wherein an arc can be produced between the cathode and the anode in a combustion chamber and a burner gas can be passed through the combustion chamber to form the plasma, in such a way that it can be produced cost-effectively and used universally, it is proposed that the plasma burner should have coolant passages for applying coolant to the anode, the coolant passages being arranged and constructed so that they can be made by machining and are free from soldered joints.

33 Claims, 4 Drawing Sheets

PLASMA BURNER WITH A FLUID-COOLED ANODE

BACKGROUND OF THE INVENTION

The invention relates to a plasma burner comprising a fluid-cooled anode and a cathode, wherein an arc can be produced between the cathode and the anode in a combustion chamber and a burner gas can be passed through the combustion chamber to form the plasma.

Plasma burners of this type are known from the state of the art. They are used, for example, in coating systems. They are normally made from brazable non-ferrous metals and particularly brass (except the electrodes). Hence they have a correspondingly high weight, which leads to drawbacks in their use.

The problem of the invention is therefore to provide a plasma burner with the above-mentioned features, which can be made cost-effectively and used universally.

In the plasma burner according to the invention with the above-mentioned features the problem is solved, in that the plasma burner has coolant passages for applying coolant to the anode, the coolant passages being arranged and constructed so that they can be made by machining and are free from soldered joints.

In plasma burners known from the state of the art coolant passages are made by means of opposing holes or counterbores. These opposing holes subsequently have to be sealed to contain pressure, which is done by brazing. This is the reason why the known apparatus is made from brazable non-ferrous metals and has a correspondingly high weight. In apparatus known from the state of the art changes of material structure are caused by the soldering process, necessitating re-machining of the soldered joints. Re-machining is complicated by the fact that the soldered joints inside the coolant passages can only be accessed from outside with great difficulty. As the soldering flux is not fully controllable during the soldering process, solder flowing into the coolant passages may narrow their cross-sections of flow, particularly at critical points. This makes it necessary for such a plasma burner to be gauged to the through-flow of coolant after re-machining and cleaning of the soldered joints. The non-controllability and non-reproducibility of the soldering flux cause correspondingly high rejection rates in production. Apparatus known from the state of the art therefore requires a large outlay on manufacture and is correspondingly expensive.

SUMMARY OF THE INVENTION

In the plasma burner according to the invention the coolant passages are arranged and constructed so that they can be made by machining and are free from soldered joints. The passages for the coolant—water in particular is used as the coolant—have no opposing holes which would subsequently have to be sealed. As the coolant passages are made without any soldered joints, no changes are caused to the structure of the material from which the plasma burner is produced. Soldering flux is also avoided. The coolant passages can be made and deburred to near their finished contour and with a snug fit, particularly by means of digitally controlled machine tools, so that no labour-intensive re-machining and no subsequent measuring and calibrating procedures are necessary for them.

Since brazing is no longer necessary, the plasma burner according to the invention may be made of non-brazable non-ferrous metals. Light materials such as hard aluminium alloys may be used in particular. This reduces the weight of the plasma burner according to the invention, for example to one-third of the weight of plasma burners according to the state of the art. It is then possible to use materials, specifically such as hard aluminium alloys, which have higher heat conductivity than previously used materials. The higher heat conductivity improves the cooling capacity and homogenization of temperature distribution within the burner components. This in particular gives the plasma burner according to the invention a longer life than known apparatus. It is especially advantageous for the burner to be made of a light metallic material, particularly a hard aluminium alloy such as AlMgSil (except the electrodes).

As its weight is lower than that of known apparatus the plasma burner according to the invention may be accurately positioned e.g. in a spraying or vapour deposition process, and the wear on the positioning device, e.g. a robot arm, is reduced through the diminished forces of inertia.

Altogether the plasma burner according to the invention can be produced far more cost-effectively and used much more universally than plasma burners known from the state of the art.

No statements have yet been made about the construction of the anode. In a beneficial version of an embodiment the anode is in the form of an annular electrode. The combustion chamber is then formed between an internal annular chamber of the annular electrode and the cathode, so that the chamber encompasses a large space and the plasma can be produced effectively. An annular electrode of this type may be fluid-cooled in a simple manner, for example by applying coolant to a side of the electrode facing away from the combustion chamber.

It is particularly favourable from the manufacturing method aspect for the plasma burner to include an anode holder in which the anode is inserted. This enables the burner to be assembled in a simple manner.

For the supply of coolant to the anode and the discharge of coolant from the anode, it is advantageous for the coolant passages to include flow passages arranged substantially parallel with a longitudinal axis of the anode and to include flow passages arranged at an angle to the longitudinal axis of the anode.

It is particularly advantageous for flow passages for applying coolant to the anode to be made integrally with the anode holder. In this way the flow passages can be produced by simple methods, and can be arranged and, constructed in such a way that the coolant applied to the anode cools it to the optimum.

It is then particularly advantageous for a flow chamber for the coolant which will be applied to the anode to be formed between the anode holder and the anode. In this way an anode surface facing away from the combustion chamber can have coolant applied to it over a large area, so that heat is dissipated from the anode over a large area. This particularly lengthens the life of the anode.

In a version of an embodiment which is especially favourable from the point of view of manufacturing method, the flow passages of the anode holder which are arranged parallel with a longitudinal axis of the anode holder are made by means of blind hole bores.

A supply of coolant to the anode can then be obtained in a particularly simple manner, if the flow passages of the anode holder, which are arranged at an angle to the longitudinal axis of the anode holder, lead from the flow passages which are parallel with the longitudinal axis of the anode holder, into the flow chamber. The flow passages leading into the flow chamber and/or orifices opening into the flow chamber can then be made in a simple manner by milling, thereby opening up supply and discharge lines into the flow chamber.

In a particularly beneficial version of an embodiment the anode holder comprises flow passages which open into an upper region of the flow chamber, remote from a plasma outlet of the plasma burner, and which serve to supply coolant for cooling the anode. This enables the anode to have coolant applied to it over a large area, and fresh coolant can be fed to the hottest parts of the anode, thereby optimizing heat dissipation from it. The anode holder then advantageously comprises flow passages which open into a lower region of the flow chamber, towards the plasma outlet, and which serve to discharge coolant. In this way heated coolant can be discharged at less hot parts of the anode, facing towards the plasma outlet.

In order to treat a large area of the anode, the orifices of the flow passages, which lead into the upper region of the flow chamber, beneficially have a slope towards the lower region of the flow chamber, so that the stream of coolant flowing into the flow chamber is widened and coolant is applied to the anode over a large area.

The orifices of the flow passages leading into the upper region of the flow chamber advantageously have a widened portion in a peripheral direction. This also contributes to the application of coolant to a large area of the anode, in that the coolant runs into the flow chamber via a large peripheral section.

In a favourable version of an embodiment the anode holder comprises at least two passages for supplying coolant to the flow chamber. An anode holder of this type can be produced simply and cost-effectively, and thorough cooling of the anode is ensured.

From the manufacturing method aspect it is favourable for the anode holder to comprise at least two passages for discharging coolant from the flow chamber. Such an anode holder can be made cost-effectively, and a good flow of coolant through the flow chamber is ensured for cooling the anode.

In a particularly beneficial version of an embodiment the plasma burner is held releasably to a holding arm with a friction or non-positive lock by means of a clamping device, the clamping device being constructed so that it allows rapid exchange of the plasma burner on the holding arm. The burner can therefore be exchanged easily. This is especially beneficial if a plasma burner fails, e.g. through electrode breakdown, and has to be replaced within a cooling phase of the workpiece being processed, so that the processing can be continued. It is further possible, for example, to have plasma burners each adapted to a specific treatment process and to use them for the individual steps in multi-treatment processes applied to the workpiece.

The clamping device advantageously has a detachable clamping lever which forms the friction lock between the holding arm and the plasma burner. Such a lever is easily operated and forms a secure friction lock for a low financial and manufacturing outlay.

In one version of an embodiment the holding arm is a robot arm, which allows the plasma burner to be positioned accurately for processing a workpiece.

The plasma burner may advantageously be coupled to a supply of burner gas for the burner gas used for plasma formation by a plug-in coupling. It is also an advantage if the plasma burner can be coupled to a coolant supply, particularly a water supply, by means of a plug-in coupling, and if the plasma burner can be coupled to a coolant discharge by means of a plug-in coupling. In this way the burner gas supply, coolant supply and coolant discharge can easily be uncoupled from and re-coupled to the burner when the burner is to be or needs to be exchanged. Exchange times can thereby be minimized, so that times of less than two minutes in particular can be obtained and excessive cooling of a workpiece being processed can be avoided by such a quick change.

The plug-in coupling beneficially comprises a plug or cone valve, so that the impermeability of the coupling is ensured in a simple and cost-effective manner.

The plasma burner according to the invention may advantageously be used in coating systems.

DETAILED DESCRIPTION OF THE INVENTION

Figure 1:
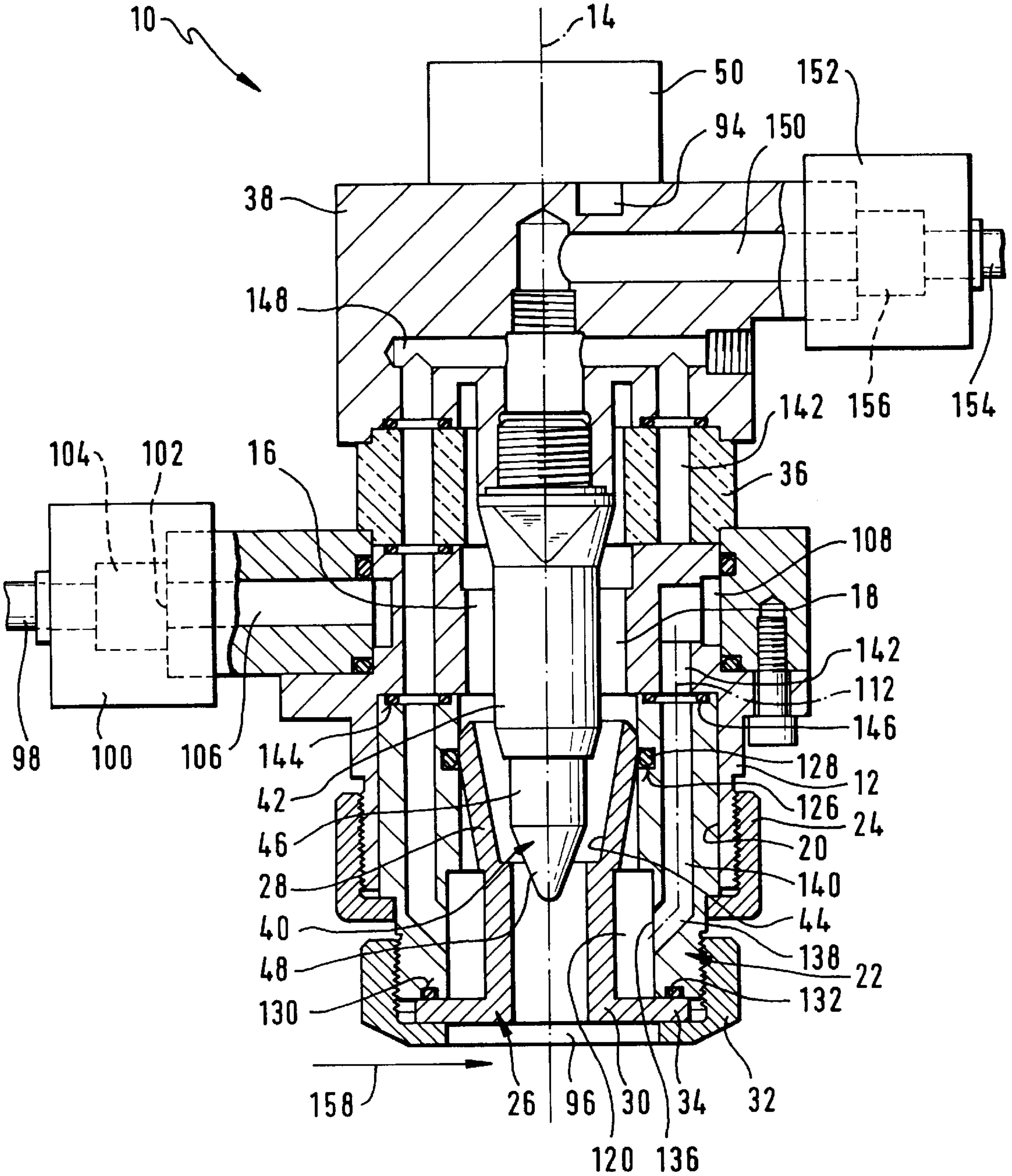
FIG. 1 shows an embodiment of a plasma burner according to the invention as a diagrammatic representation.

An embodiment of a plasma burner according to the invention, shown generally at 10 in FIG. 1, comprises a housing 12 with a central axis 14. The housing has a cavity 16 coaxial with the central axis 14. The cavity 16 includes a first section 18 and a second section 20 of larger diameter than the first.

An anode holder 22 is inserted in the second section 20 of the cavity 16. It is joined to the housing 12 by a fastening member 24 such as a union nut. A longitudinal axis of the anode holder 22 is coaxial with the central axis 14 of the housing 12.

An anode 26, in the form of an annular electrode with a longitudinal axis coaxial with the central axis 14, is inserted in the holder 22. It comprises a first portion 28 of V-shaped cross-section, arranged in the holder 22 and facing towards the first section 18 of the cavity 16, and a second portion 30 of L-shaped cross-section, adjoining the V-shaped portion 28 in the direction of a lower end of the housing 12 of the plasma burner 10 according to the invention. The anode 26 is held in the holder 22 by a fastening member 32, which may in particular be a union nut, by means of a disc-shaped support 34 of the L-shaped portion 30.

The anode 26 is nozzle-shaped by means of the V-shaped portion 28 and L-shaped portion 30, and thereby acts as a burner nozzle for a plasma jet.

A cathode holder 38 holding a cathode 40 is seated at an upper end of the housing 12 remote from the anode holder 22 and is electrically separated from the housing 12 by insulating members 36. It comprises a holding member 42 which holds the cathode 40 in an inner annular chamber of the anode 26. A combustion chamber 44 is thereby formed in that chamber between the anode 26 and the cathode 40.

The holding member 42 extends through the first section 18 of the cavity 16 into the anode holder 22.

The cathode 40 is formed by a first cylindrical section 46 and a second conical section 48; the cone tip of the second section 48 is rounded and points towards the lower end of the housing 12 coaxially with the longitudinal axis of the anode 26. The combustion chamber 44 is rotationally symmetrical relative to the axis 14.

The plasma burner 10 according to the invention comprises a power supply (not shown), whereby a high voltage can be applied between the cathode 40 and the anode 26, so that an arc can be formed between them in the combustion chamber 44, by means of which a plasma is produced from a working or burner gas passed through the chamber 44.

Figure 4:
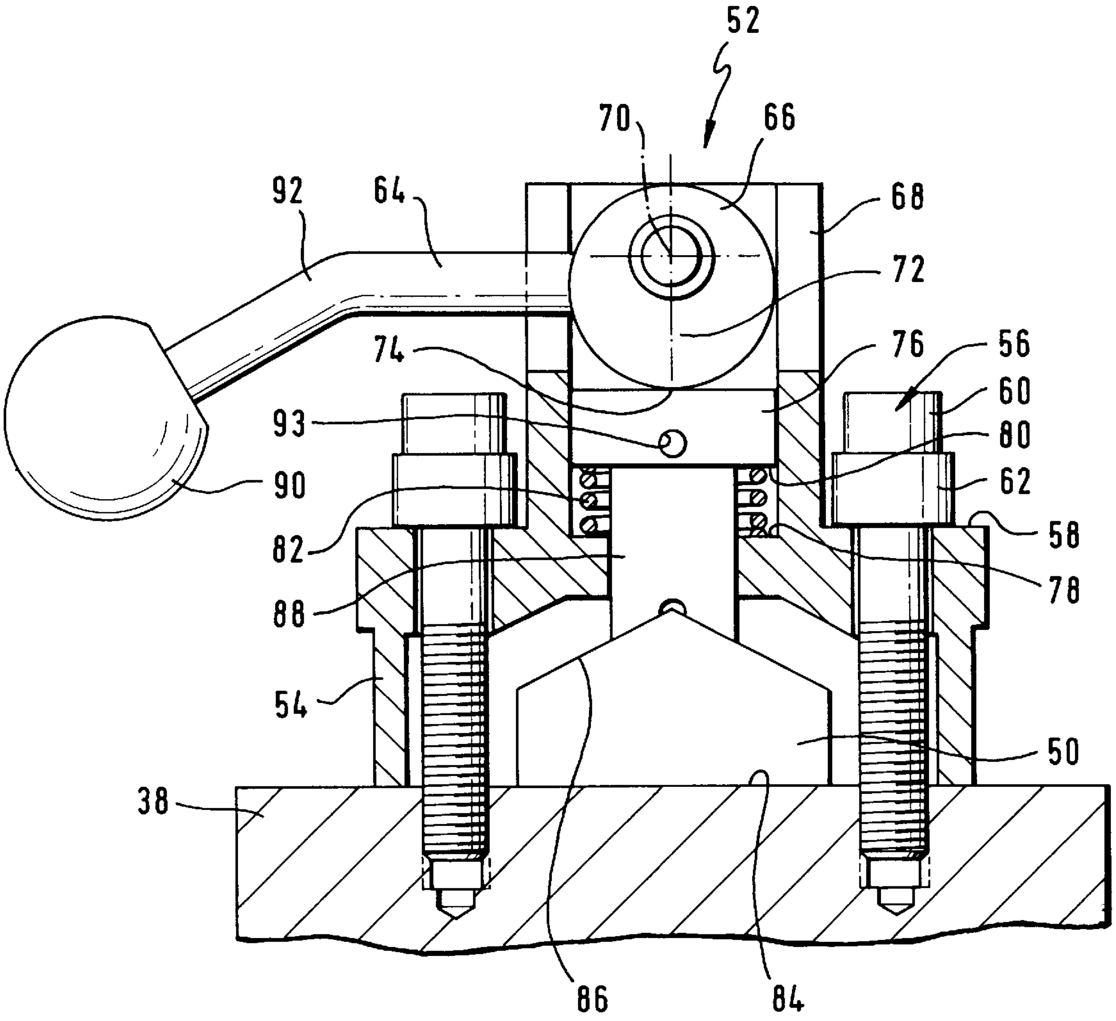
FIG. 4 is a diagrammatic representation of a clamping means for holding the plasma burner according to the invention.

The cathode holder 38 is friction-locked to a holding arm 50, which may for example be a robot arm. In one version of an embodiment of the invention the friction lock between the plasma burner 10 according to the invention and the arm 50 is produced by a clamping device 52 (FIG. 4). The clamping device may be arranged at an upper end of the cathode holder 38, as in the FIG. 1 version of an embodiment, or at a lateral end.

For this purpose the clamping device 52 has a clamping housing 54 which is friction-locked to the cathode holder 38 by screws or studs 56 as shown in FIG. 4. Lock washers 62 are seated between a supporting surface 58 of the clamping housing 54 and heads 60 of the screws or studs 56; they are in particular high tension protector washers and may include cup springs, used to hold the housing 54 securely to the cathode holder 38.

The clamping device 52 comprises a clamping lever 64, which is mounted rotatably with a clamping disc 66 in a clamping disc guide 68 of the housing 54.

An axis of rotation 70 of the clamping disc 66 is eccentric therefrom, so that a spacing 72 between that axis 70 and a point 74 where the clamping disc engages a bearing member 76 can be varied by turning the lever 64. The bearing member 76 can exert a force on the holding arm 50, thereby producing a clamping force.

A spring 82 for transmitting the clamping force is arranged between a supporting surface 78 of the clamping housing 54 and a supporting surface 80 of the bearing member 76 facing away from the point of engagement 74 of the clamping disc 66.

By exerting a clamping force on the bearing member 76 by means of the clamping lever 64, the holding arm 50 is pressed against a surface 84 of the cathode holder 38, so that a friction lock is thereby obtained between the arm 50 and the holder 38.

To improve the friction lock the holding arm 50 has an upper end which is shaped as an equilateral triangle 86 in cross-section. A pressure member 88 of the bearing member 76 has a recess shaped as an equilateral triangle at its end towards the holding arm 50; the recess matches the upper end 86 of the holding arm 50, so that the pressure member 88 can be brought into engagement with the arm 50 non-displaceably in a lateral direction.

The clamping lever 64 has a spherical handle 90 at one end for easy handling. The lever 64 is beneficially provided with a lever rod 92 with a bend in it to improve transmission of leverage.

The bearing member 76 contains an aperture 93 parallel with the axis 70. By inserting a locking pin in it the bearing member 76 can be fixed relative to the clamping housing 54 in order to secure the clamping action.

The plasma burner 10 according to the invention includes a burner gas feed 94 (FIG. 1) connected to a supply of burner gas (not shown). It is coupled to the gas supply by means of a plug-in valve (not shown), so that the plasma burner 10 according to the invention can be quickly uncoupled from and re-coupled to the gas supply by releasing the plug-in coupling. The burner gas, which may for example be argon or hydrogen, is passed through the feed 94 into the combustion chamber 44, where a plasma is produced; this flows out of the burner 10 as a jet at a plasma outlet 96.The plasma burner 10 according to the invention is connected to a supply of coolant (not shown), particularly a supply of water. A coolant supply pipe 98 leads from it to a coupling 100, which may in particular be of the plug-in type. The coolant pipe 98 can be coupled by it to a coolant inlet 102 of the burner housing 12. The coupling 100 includes a plug valve 104 to ensure its tightness, and can be uncoupled from and re-coupled to the burner 10 according to the invention in a quick and simple manner.

A coolant pipe 106 leads from the coolant inlet 102 of the burner 10 according to the invention to an annular chamber 108 formed in the housing 12. Coolant passages 110 (FIG. 3b; covered in FIG. 1), with an axis 112 parallel with the central axis 14, lead from the chamber 108 to the anode holder 22.

In the version of an embodiment shown in FIGS. 2 and 3*a* to 3*c* two coolant passages 110, diametrically opposite each other, lead to the anode holder 22.

The coolant passages 110 in the anode holder are continued by coolant passages 114 extending towards the lower end of the burner 10 according to the invention. Seals 116 are seated at the transition from the passages 110 in the housing 12 to the passages 114 in the anode holder 22, to prevent coolant from penetrating into the gap between the housing 12 and the anode holder 22. The coolant passages 114 discharge at an orifice 118 into a flow chamber 120 formed between an outside of the anode 26 and the anode holder 22.

The orifices 118 of the coolant passages 114 are located in an upper region, remote from the plasma outlet 96.

Figure 3A:
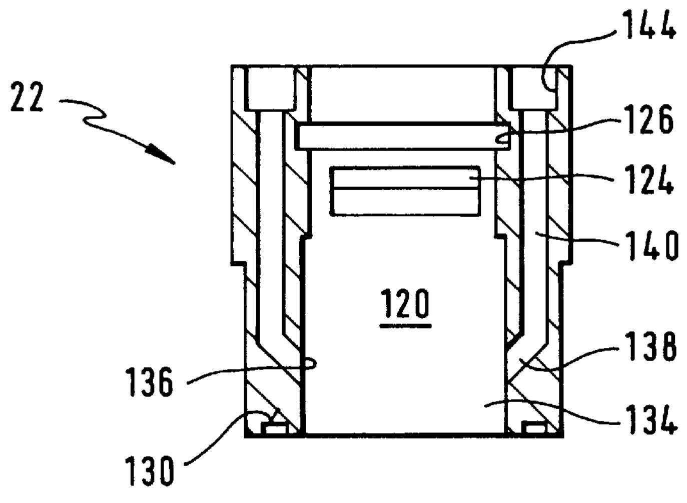
FIG. 3*a* is a section A—A through the anode holder according to the invention in FIG. 2.
Figure 3B:
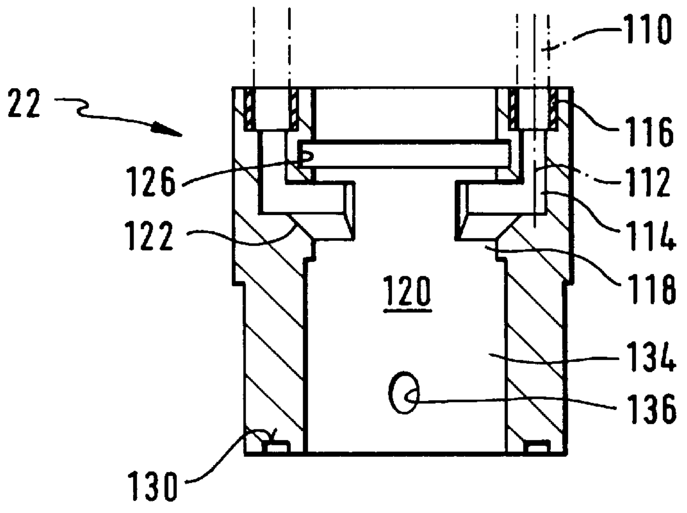
FIG. 3*b* is a section B—B through the anode holder according to the invention in FIG. 2.
Figure 3C:
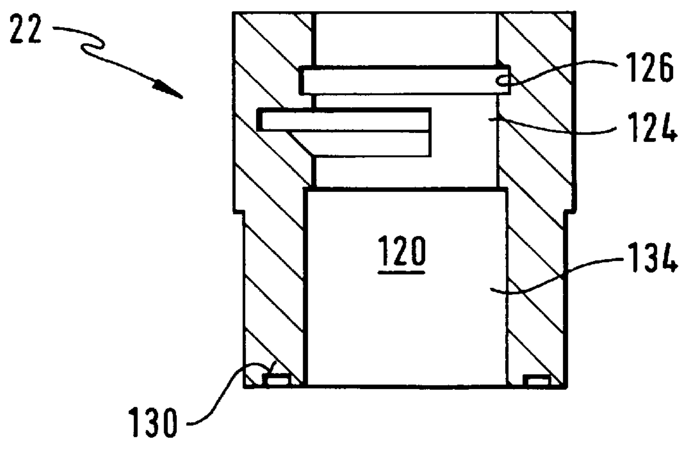
FIG. 3*c* is a section C—C through the anode holder according to the invention in FIG. 2.

They have a slope 122 in the direction of the plasma outlet 96. In a peripheral direction they have a widened portion 124 (FIGS. 3*a*, 3*b*).

To seal off the flow chamber 120 impermeably from the combustion chamber 44 and the housing 12 in between the anode 26, the anode holder has an annular recess 126 in which an O-ring 128 (FIG. 1) is seated as a seal between the anode 26 and the anode holder 22. To seal off the support 34 of the anode 26, the anode holder 22 contains an annular groove 130 in which an O-ring 132 is seated (FIG. 1).

The coolant passages 114 with their axis 112 in the anode holder 22 are made as blind hole bores, and the orifices 118 discharging into the flow chamber 120 are made by milling. For this purpose milling cutters, e.g. milling discs, are inserted through an inner chamber 134 of the anode holder 22.

The coolant passages 114 are thus made so that they are free of opposing holes, with the result that brazing in particular, for pressure-containing sealing of opposing holes, is unnecessary.

In a lower region towards the plasma outlet 96 the flow chamber 120 has outlet openings 136 (FIGS. 1, 3*a*, 3*b*), adjoined in the anode holder 22 by flow passages 138 with an axis which forms an angle of e.g. 45° with the central axis 14. The flow passages 138 merge into flow passages 140 with axes parallel to the central axis 14, for discharging coolant from the flow chamber 120.

The flow passages 140 of the anode holder 22 lead into flow passages 142 in the housing 12 (FIG. 1); the top of the anode holder 22 has recesses 144 at the flow passages 140, in which O-rings 146 are seated in order to seal the housing 12 against penetration of discharged coolant into the combustion chamber 44.

The flow passages 142 lead through the insulating members 36 into the cathode holder 38 and into a pipe 148 with an axis perpendicular to the axes of the flow passages 142. From the pipe 148 a discharge pipe 150 leads to a coupling 152, which may in particular be of the plug-in type. From the coupling 152 a pipe 154 leads to a coolant discharge unit (not shown), by means of which the coolant is discharged and fed e.g. to a treatment station.

The coupling 152 has a plug valve 156 which ensures the tightness of the coupling 152.

Figure 2:
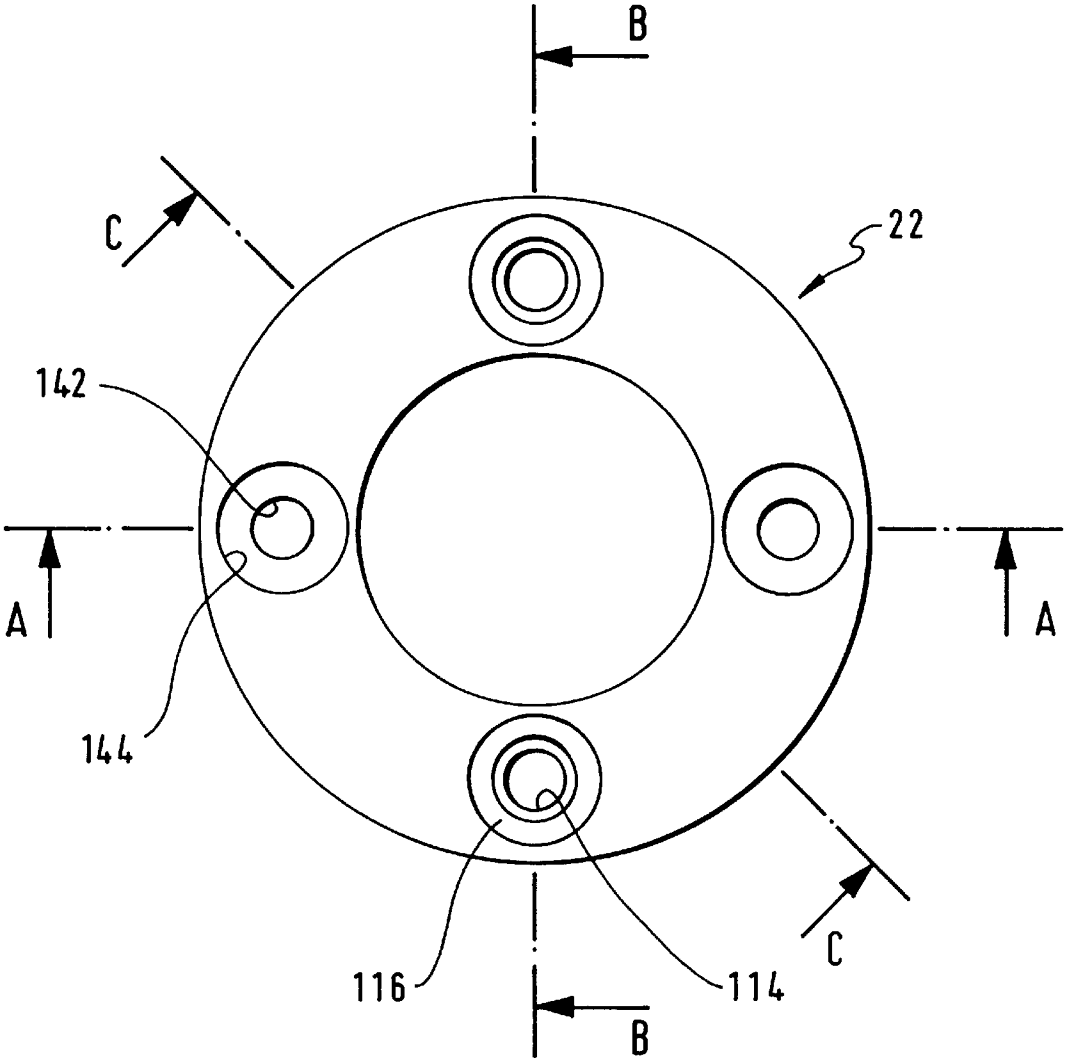
FIG. 2 is a plan view of an anode holder according to the invention.

In the version of an embodiment shown in FIG. 2 the anode holder 22 has two flow passages 140 which are diametrically opposed.

The flow passages 140 and 138 can be made in the anode holder 22 by machining, without a counter-bore having to be provided which would then subsequently have to be brazed to contain pressure. The plasma burner is made of a light metallic material, for example a hard aluminium alloy, except for the electrodes.

In accordance with the invention provision may be made for the plasma burner apparatus to be covered with a protective coating, particularly a ceramic-based one, for insulation against electric breakdowns and thus for protection of operating personnel. The thickness of the protective coating may, for example, be of the order of 50 $\mu$m.

The apparatus according to the invention operates as follows:

A high voltage is applied between the cathode 40, which may e.g. be of tungsten, and the anode 26, which may e.g. be of copper. An arc is thereby formed between cathode and anode in the combustion chamber 44. The burner gas, which is supplied to the combustion chamber 44 via the feed 94, absorbs energy from the arc; a plasma forms and emerges from the plasma outlet 96 as a jet. The V-shaped portion 28 of the anode 26 increases the speed of flow of the burner gas and plasma, so that the anode 26 acts as a plasma nozzle.

When the burner is used in a coating system an additional material 158 is fed into the plasma jet downstream of the plasma outlet 96, e.g. in powder or rod form, and is heated and vaporized by the hot plasma flow. This additional active ingredient 158 is then fed to the workpiece with strong kinetic energy by means of the jet.

The anode 26 has to be cooled with a coolant, and water may in particular be used as the coolant.

For this purpose the coolant is fed in by means of the coupling 100, from a supply of coolant into the plasma burner 10 according to the invention through the annular chamber 108, and flows from there through the coolant passages 110 and 114 into the flow chamber formed between the anode 26 and the anode holder 22, via the orifices 118. The structure of the orifices 118 with the slopes 122 and widened portions 124 ensures that the coolant in the flow chamber 120 is applied to the anode 26 over a large area, thereby ensuring good heat dissipation from the anode.

The heated coolant is discharged through the flow passages 138, 140, 142 and the discharge pipe 150 via the coupling 152.

The plasma burner 10 according to the invention, which is held to the holding arm 50, can be exchanged quickly by means of the clamping device 52 according to the invention. This may be necessary if the burner malfunctions, e.g. through electrode breakdowns. The exchange must be carried out quickly in order to prevent excessive cooling of the workpiece being treated. For this purpose the couplings for coolant supply, coolant discharge and burner gas supply are of the plug-in type, so that the whole burner exchange can take place in a short time and particularly in less than two minutes.

Exchange of the plasma burner may also be necessary if a workpiece is treated by a plurality of processes and different types of burner have to be used for each process.

What is claimed is:

1. A plasma burner, comprising:

a body consisting substantially of a light, non-ferrous metal;

a fluid-cooled anode;

a cathode;

a combustion chamber in which the cathode and the anode are adapted to produce an arc, and through which a burner gas is adapted to be passed to form the plasma; and coolant passages for applying coolant to the anode, and withdrawing the coolant from the anode; wherein:

the coolant passages are formed within said body, and are arranged and constructed so that they are formed free of opposing, counter-bored holes, are made by machining, and are free from soldered and brazed joints.

2. A plasma burner according to claim 1, wherein:

said light, non-ferrous metal consists of a hard aluminium alloy.

3. A plasma burner according to claim 1, wherein:

the anode is in the form of an annular electrode.

4. A plasma burner according to claim 1, further comprising:

an anode holder in which the anode is inserted.

5. A plasma burner according to claim 1, wherein:

the coolant passages include flow passages which are substantially parallel with a longitudinal axis of the anode.

6. A plasma burner according to claim 1, wherein:

the coolant passages include flow passages which are arranged at an angle to the longitudinal axis of the anode.

7. A plasma burner according to claim 4, wherein:

said coolant passages include flow passages for applying coolant to the anode which are made integrally with the anode holder.

8. A plasma burner according to claim 4, further comprising:

a flow chamber coupled to the coolant passages for applying coolant to the anode;

said flow chamber being formed between the anode holder and the anode.

9. A plasma burner according to claim 7, wherein:

the flow passages of the anode holder include respective portions which are substantially parallel with a longitudinal axis of the anode holder, and which are made by means of blind hole bores.

10. A plasma burner according to claim 8, wherein:

the flow passages of the anode holder include respective portions which are substantially parallel with a longitudinal axis of the anode holder, and which are made by means of blind hole bores, and respective portions which are arranged at an angle to the longitudinal axis of the anode holder, and which lead from the substantially parallel flow passage portions into the flow chamber.

11. A plasma burner according to claim 10, wherein:

the flow passage portions leading into the flow chamber and/or orifices opening into the flow chamber are made by milling.

12. A plasma burner according to claim 7, wherein:

the anode holder comprises flow passages which open into an upper region of the flow chamber remote from a plasma outlet of the plasma burner and which serve to supply coolant for cooling the anode.

13. A plasma burner according to claim 12, wherein:

the flow passages open into a lower region of the flow chamber, towards the plasma outlet, and serve to discharge coolant.

14. A plasma burner according to claim 12, wherein:

the orifices of the flow passages, which lead into the upper region of the flow chamber, have a slope towards the lower region of the flow chamber.

15. A plasma burner according to claim 12, wherein:

the orifices of the flow passages which lead into the upper region of the flow chamber have a widened portion in a peripheral direction.

16. A plasma burner according to claim 7, wherein:

the anode holder comprises at least two passages for supplying coolant to the flow chamber.

17. A plasma burner according to claim 7, wherein:

the anode holder comprises at least two of said flow passages for discharging coolant from the flow chamber.

18. A plasma burner according to claim 1, wherein:

the plasma burner is held releasably to a holding arm with a friction lock by means of a clamping device, the clamping device being constructed so that it allows rapid exchange of the plasma burner on the holding arm.

19. A plasma burner according to claim 18, wherein:

the clamping device has a detachable clamping lever which forms the friction lock between the holding arm and the plasma burner.

20. A plasma burner according to claim 18, wherein:

the holding arm is a robot arm.

21. A plasma burner according to claim 1, wherein:

the plasma burner may be coupled by a plug-in coupling to a supply of burner gas for the burner gas used for plasma formation.

22. A plasma burner according to claim 1, wherein:

the plasma burner may be coupled by means of a plug-in coupling to a coolant supply, particularly a water supply.

23. A plasma burner according to claim 1, wherein:

the plasma burner may be coupled to a coolant discharge by means of a plug-in coupling.

24. A plasma burner according to claim 21, wherein:

the plug-in coupling comprises a plug valve.

25. A plasma burner according to claim 1, wherein:

the anode is constructed as a plasma nozzle.

26. A plasma burner according to claim 1, wherein:

said burner is adapted to be used in a coating or vapour-depositing system.

27. A plasma burner according to claim 4, wherein:

the coolant passages comprise successive first and second portions that extend in the anode holder, said first portion comprises a blindly-bored hole, and said second portion comprises a milled passage that extends from said first portion toward said anode.

28. A plasma burner according to claim 1, wherein:

the coolant passages are free from brazed joints.

29. A plasma burner according to claim 1, wherein:

said light, non-ferrous metal consists of a hard alloy.

30. A plasma burner, comprising:

a body consisting substantially of a light, non-ferrous metal;

a fluid-cooled anode;

a cathode;

a combustion chamber in which the cathode and the anode are adapted to produce an arc, and through which a burner gas is adapted to be passed to form the plasma; and a plurality of tubular coolant passages for supplying coolant to the anode, and withdrawing the coolant from the anode; wherein:

the coolant passages are formed within bulk material of said body, and are arranged and constructed so that they are formed free of opposing, counter-bored holes, are made by machining, and are free from soldered and brazed joints.

31. The plasma burner of claim 30, wherein:

said plurality of tubular coolant passages are arranged evenly around said anode for applying coolant to the anode.

32. The plasma burner of claim 30, wherein:

said light, non-ferrous metal consists of a hard alloy.

33. A plasma burner according to claim 32, wherein:

said hard alloy consists of a hard aluminium alloy.

* * * * *